United States Patent [19]

Stone

[11] 4,089,274
[45] May 16, 1978

[54] BULKHEAD OPERATING MECHANISM
[75] Inventor: Thomas G. Stone, Hinsdale, Ill.
[73] Assignee: Evans Products Company, Portland, Oreg.
[21] Appl. No.: 724,400
[22] Filed: Sep. 17, 1976
[51] Int. Cl.² .............................................. B60P 7/14
[52] U.S. Cl. ..................................... 105/376; 254/74
[58] Field of Search .................... 105/376; 254/73, 74, 254/75, 169

[56] References Cited
U.S. PATENT DOCUMENTS

| 1,845,758 | 2/1932 | McDuff | 254/75 |
| 2,340,409 | 2/1944 | Benjamin | 254/74 |
| 3,261,588 | 7/1966 | Jensen et al. | 254/74 |
| 3,298,143 | 1/1967 | Rogers et al. | 105/376 X |
| 3,384,034 | 5/1968 | Loomis et al. | 105/376 |
| 3,593,674 | 7/1971 | Winterfeldt et al. | 105/376 |
| 3,808,982 | 5/1974 | Bertram et al. | 105/376 |

Primary Examiner—Albert J. Makay
Attorney, Agent, or Firm—Harness, Dickey & Pierce

[57] ABSTRACT

A freight bracing bulkhead assembly incorporating a suspension system including an inching chain for assisting in movement of the bulkhead assembly along the cargo area. A lever mechanism is provided for detachable connection to the chain for applying a pulling force to the chain.

4 Claims, 3 Drawing Figures

U.S. Patent   May 16, 1978   4,089,274
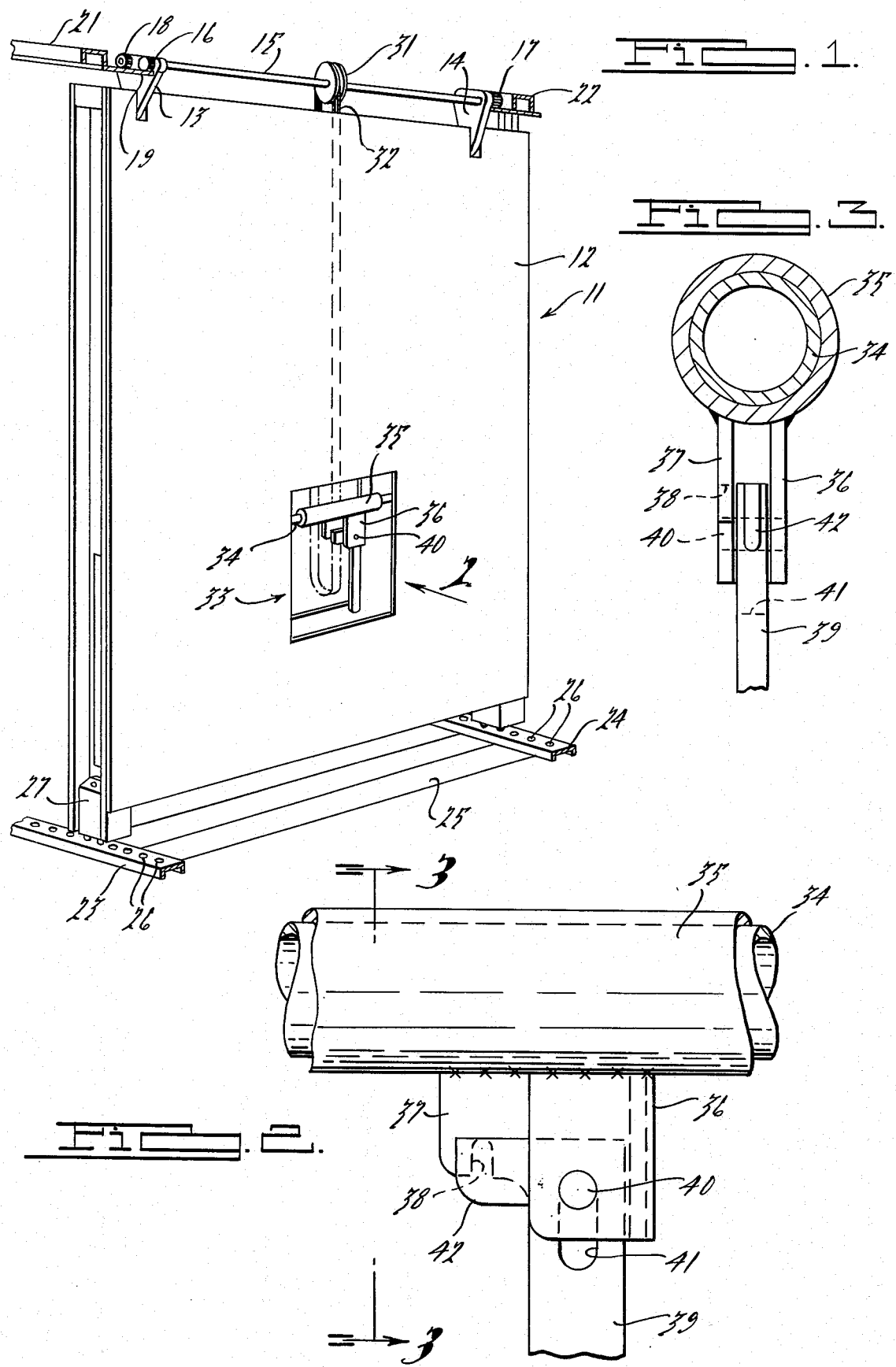

BULKHEAD OPERATING MECHANISM

BACKGROUND OF THE INVENTION

This invention relates to a bulkhead operating mechanism and more particularly to a structure for facilitating movement of a freight bracing bulkhead assembly along a cargo area.

Bulkhead assemblies are employed for bracing freight in railroad cars, highway trailers or like freight transporting vehicles. The bulkhead assembly includes a large panel or frame that spans at least a portion of the width of the cargo area and which is supported for movement along the length of the cargo area. Such bulkhead panels or frames are conventionally supported on overhead track assemblies. It has been the practice to provide a chain fall that operates sprocket wheels which cooperate with the overhead track to facilitate movement of the bulkhead assembly to and from bracing positions. The chain fall offers some mechanical advantage that assists in movement of the bulkhead assembly, when positioned closely adjacent the load. In many instances, however, the chain fall per se does not afford sufficient mechanical advantage to achieve either initial or final movement of the bulkhead panel.

It is, therefore, a principal object of the invention to provide an improved mechanism for moving a bulkhead assembly in a cargo area.

It is another object of the invention to provide a bulkhead operating mechanism that further multiplies the mechanical advantage and force applied to a bulkhead chain fall.

SUMMARY OF THE INVENTION

This invention is adapted to be embodied in a bulkhead assembly for bracing freight in a railroad car or the like that defines a cargo area and which has a pair of spaced tracks. The bulkhead assembly comprises a panel that forms a surface to engage freight in the cargo area. A timing shaft is journaled on the bulkhead panel and carries wheels at its ends that are adapted to contact the tracks and effect movement of the panel along the tracks upon rotation of the timing shaft. A sprocket is affixed for rotation with the timing shaft; and an endless chain is looped over the sprocket for rotating the sprocket and the timing shaft upon the application of a pulling force to the chain. In connection with the aforenoted structure, the invention comprises the use of a lever pivotally supported on the bulkhead panel and which lever affords a detachable connection to the chain for applying a pulling force to the chain.

BRIEF DESCRIPTION OF THE DRAWINGS

FIG. 1 is a perspective view of a portion of a railroad car embodying this invention, with portions being broken away.

FIG. 2 is an enlarged elevational view looking in the direction of the arrow 2 in FIG. 1.

FIG. 3 is a cross-sectional view taken along the line 3—3 of FIG. 2.

DETAILED DESCRIPTION OF THE PREFERRED EMBODIMENT

A bulkhead assembly embodying this invention is identified generally by the reference numeral 11. The bulkhead assembly 11 is particularly adapted for use in bracing freight in a transporting vehicle such as a railroad box car, highway trailer or the like. The bulkhead assembly 11 is comprised of a panel assembly 12 that is suspended by means of a pair of carriages 13 and 14. The carriages 13 and 14 support a timing shaft 15 that carries a pair of sprocket wheels 16 and 17 at its opposite ends. As is well known in this art, the sprocket wheels 16 and 17 are affixed for rotation with the timing shaft 15 and at least one of the sprocket wheels 16 or 17 is free to move axially on the timing shaft 15.

Additional roller supports 18 may be carried by the carriages 13 and 14. The roller supports 18 and sprocket wheels 16 and 17 engage horizontally extending legs 19 of overhead tracks 21 and 22 that are affixed in any known manner to the transporting vehicle. The track legs 19 are formed with apertures or teeth that cooperate with the sprocket wheels 16 and 17 so as to time the rotation of the shaft 15 and prevent cocking or skewing of the panel 12 as it is moved along the cargo area, as is well known in this art.

A pair of lower locking tracks 23 and 24 are positioned in the floor 25 of the transporting vehicle. The tracks 23 and 24 have apertures 26 that are adapted to receive projections of locking pins 27 that are slidably supported at the opposite lower edges of the panel assembly 12. Similar locking pins are provided at the upper corners of the panel assembly 12 and coact with the tracks 21 and 22. The locking pins are operated simultaneously by a suitable operating mechanism (not shown) for locking the panel 12 in selected positions within the transporting vehicle.

As is also common in this art, one or more sprockets 31 are affixed to the timing shaft 15. In the illustrated embodiment, one sprocket 31 is positioned centrally of the shaft 15. It is, however, within the purview of the invention to employ two such sprocket wheels, one adjacent each of the carriages 13 and 14. An endless chain 32 is trained over the sprocket 31 and hangs down toward the lower portion of the panel assembly 12 where it may be gripped by an operator. Pulling on the chain 32 will rotate the sprocket 31 and timing shaft 15 so as to drive the panel 12 along the overhead tracks 21 and 22 to or from desired locations.

A mechanism, indicated generally by the reference numeral 33 is provided to afford a mechanical advantage or force multiplier to amplify the force exerted by an operator on the chain 32 and timing shaft 15. The mechanism 33 includes a horizontally disposed shaft 34 that is affixed in any suitable manner to the bulkhead panel 12. A sleeve 35 is journaled upon the shaft 34 and carries a depending bracket 36. The bracket 36 has an offset arm 37 in which a notch 38 is formed. The notch 38 is configured to grip one link of the chain 32.

The bracket 36 is bifurcated and a pin 40 extends through the open center of the bracket 36. A handle 39 has an elongated slot 41 that receives the pin 40. The pin 40 and slot 41 connection between the handle 39 and the bracket 36 permits the handle 39 to be hung by gravity to a normal position as shown in the Figures. In this position, an outstanding arm 42 normally overlies the notch 38 so that the links of the chain 32 cannot become accidentally engaged with the notch 38.

When it is desired to make use of the mechanical advantages afforded by the handle 39 to operate the timing shaft 15, the handle 39 is raised upwardly as permitted by the length of the slot 41. This moves the outstanding arm 42 clear of the notch 38 so that a link of the chain 32 may be inserted into the notch 38. The handle 39 is then pivoted about its supporting shaft 34 so as to apply a magnified force to the chain 32 to facilitate rotation of the shaft 15. Thus, considerable mechanical advantage for rotating the shaft 15 is provided.

It is to be understood that the foregoing description is that of a preferred embodiment of the invention. Various changes and modifications may be made without departing from the spirit and scope of the invention as defined by the appended claims.

I claim:

1. In a bulkhead assembly for bracing freight in a railroad car or the like defining a cargo area and having a pair of spaced tracks, said bulkhead assembly comprising panel means presenting a surface to engage freight in the cargo area, a timing shaft journaled on said bulkhead panel means, wheels on the ends of said timing shaft adapted to contact said tracks and effect movement of said panel means therealong upon rotation of said timing shaft, a sprocket affixed for rotation with said timing shaft, and an endless chain looped over said sprocket for rotating said sprocket and said timing shaft upon the application of a pulling force to said chain, the improvement comprising lever means pivotally supported on said bulkhead panel means, a notch in a portion of said lever means adapted to receive a link of said chain for affording a detachable connection to said chain for applying a pulling force to said chain when connected thereto and means to preclude inadvertent entry of the chain links into said lever means notch comprising a latch movable between a blocking position and a released position.

2. A bulkhead assembly as set forth in claim 1 wherein the latch is biased by gravity to its blocking position.

3. In a bulkhead assembly for bracing freight in a railroad car or the like defining a cargo area and having a pair of spaced tracks, said bulkhead assembly comprising panel means presenting a surface to engage freight in the cargo area, a timing shaft journaled on said bulkhead panel means, wheels on the ends of said timing shaft adapted to contact said tracks and effect movement of said panel means therealong upon rotation of said timing shaft, a sprocket affixed for rotation with said timing shaft, and an endless chain looped over said sprocket for rotating said sprocket and said timing shaft upon the application of a pulling force to said chain, the improvement comprising a pivot shaft affixed to the bulkhead panel, a sleeve rotatably journaled upon said pivot shaft, bracket means affixed to said sleeve and depending therefrom, means on said bracket means defining a notch adapted to receive a link of the chain, and a handle operably connected to said bracket means for rotating said bracket means and applying a pulling force to said chain when connected thereto.

4. A bulkhead assembly as set forth in claim 3 wherein the handle means is operatively connected to the bracket means by means of a pin affixed to the bracket means and a slot formed in the handle means whereby the handle means is slidable relative to the bracket means, said handle means having blocking means adapted to overlie said notch when said handle means is in one extreme position for precluding inadvertent entry of a chain link into said notch.

* * * * *